Figure 1:
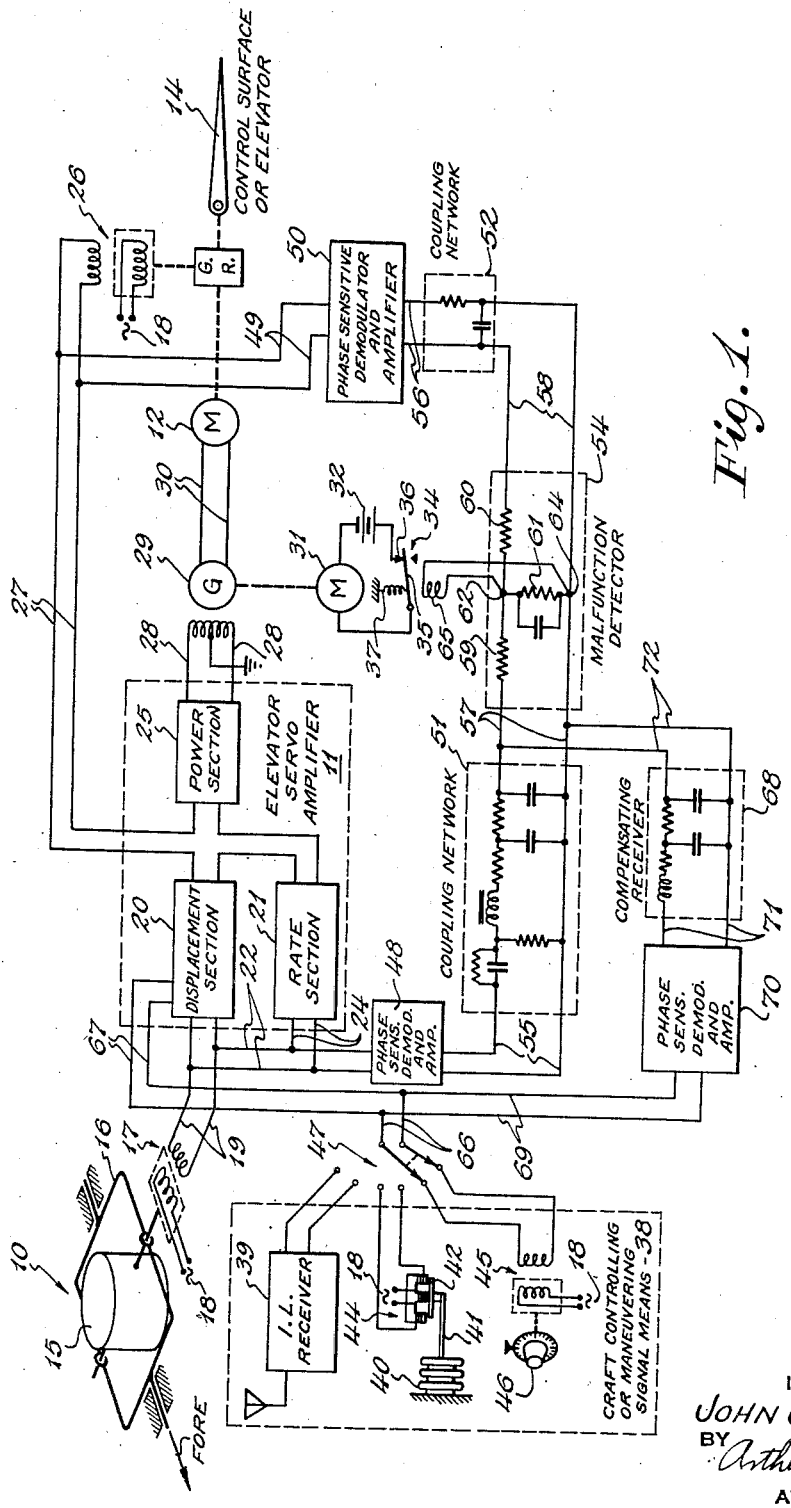

Feb. 18, 1958    J. J. HESS, JR    2,823,877
CONTROL SYSTEMS FOR DIRIGIBLE CRAFT
Filed June 10, 1954    2 Sheets-Sheet 1

INVENTOR
JOHN J. HESS, JR.
BY
Arthur H. Serrell
ATTORNEY

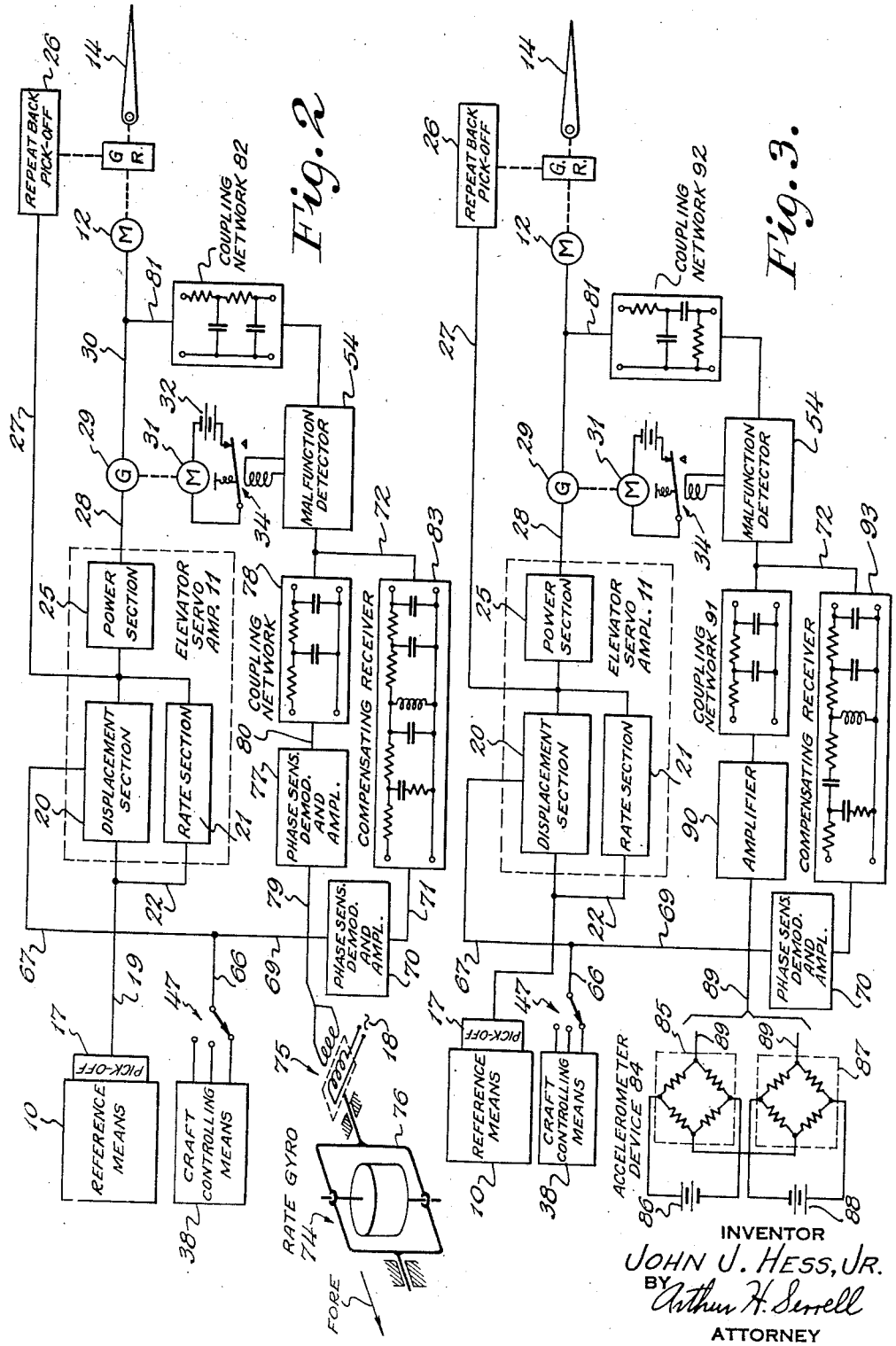

United States Patent Office 2,823,877
Patented Feb. 18, 1958

2,823,877
CONTROL SYSTEMS FOR DIRIGIBLE CRAFT

John J. Hess, Jr., Garden City, N. Y., assignor to Sperry Rand Corporation, a corporation of Delaware Application June 10, 1954, Serial No. 435,780

20 Claims. (Cl. 244—77)

This invention relates to an improvement in control systems for dirigible craft of the general character shown and described in U. S. Letters Patent No. 2,487,793, issued November 15, 1949, to Orland E. Esval and Percy Halpert. The noted patent discloses a control system for dirigible craft or an automatic pilot for an aircraft whose operations are continuously monitored in order to detect any malfunction in the interest of safety for the craft and cargo and the comfort of the passengers. In the patented system, persistent operation in an incorrect sense due to malfunction such as caused by vacuum tube failure, a break in the leads of the system or mechanical trouble in a reference component resulted in operation of the monitor to either modify the functions of the system or pilot or render the same ineffective automatically. The patented system utilized an accelerometer device for a sensing means providing a signal in accordance with the actual motion of the craft about an axis such as the pitch axis. This signal was compared with a signal corresponding to the output of the servomotor of the system or pilot. The malfunction detector of the system provided a monitoring output when the compared signals of the accelerometer device and servomotor output measuring means were other than substantially equal and opposite. The patented system also included a means for bypassing the monitoring control of the system or pilot when the craft was controlled so as to be maneuvered through the system manually by the human pilot. Such a bypass was necessary in the patented system, as otherwise the monitor would be effective to prevent the craft from being so maneuvered. The monitoring action of the patented system was therefore not effective during maneuvers to detect malfunctions of the components thereof.

The primary object of the improved system is to provide a monitoring control that remains effective at all times to detect malfunctions of the elements of the system.

The craft controlling means of the improved system provides an operating signal for a servomotor that modifies effectively the normal reference provided by the control system or automatic pilot. Such means are herein illustrated in the forms of a manually settable pick-off, an altimeter with an output-providing pick-off connected thereto, and a directional radio receiving means such as an instrument landing receiver. Reference components for sensing the actual motion of the craft about an axis are herein provided in the form of a displacement measuring gyroscopic reference as well as a rate gyro for measuring rates of change of attitude.

The improved system includes a receiver for the signal of the craft controlling or maneuvering means that provides an output in accordance with the component of the output of the servomotor due to inclusion in the system of the signal of the craft controlling or maneuvering means. The output of such receiver is utilized in the system to modify one of the signal inputs to the malfunction detector so that the same remains effective with operation of the servomotor by the craft controlling or maneuvering means when malfunction occurs. Two of the inputs to the detector in one of the forms of the invention herein shown are provided in accordance with the teaching of the noted patent, one of such signals being a measure of the actual motion of the craft about the axis as obtained from an accelerometer device and the other of the signals being in accordance with the output of the servomotor of the system or pilot.

Other objects, features and structural details of the invention will be apparent from the following description when read in connection with the accompanying drawings, wherein, Fig. 1 is a schematic view and wiring diagram of an embodiment of the invention in which the gyro vertical of the system or pilot with a pick-off connected thereto provides the means for sensing the actual motion of the craft about an axis, Fig. 2 is a view similar to Fig. 1, wherein a rate gyro and pick-off provides the sensing means, and Fig. 3 is a view similar to Figs. 1 and 2, wherein an accelerometer device of the character shown in the noted patent provides the craft motion sensing means of the system or pilot.

The control system or automatic pilot illustrated in the accompanying drawings normally functions to maintain a dirigible craft such as an aircraft at a predetermined reference attitude about an axis. For the purposes of the present description, the controls shown are effective about the pitch axis of an aircraft as this axis is considered of most importance as far as safety is concerned. For this reason, the system is shown as controlling the craft through its elevator surfaces. It will be understood that the improved monitoring system is equally adaptable for use in detecting malfunctions of the system applicable to the roll and yaw axes of the craft.

All of the figures of the present specification show components that correspond to the known system elements found in Patent No. 2,487,793. Such components are indicated in the different figures by common number designations. As particularly illustrated in greater detail in Fig. 1, these components include the basic elements indicated as a reference means 10, an elevator servo amplifier 11, and a servomotor 12. As shown, the servomotor 12 is operatively connected to the elevator surfaces 14 of the craft by way of direct shafting and suitable reduction gearing. The reference means shown in Fig. 1 is a conventional type of gyro vertical with a pick-off at its minor axis that provides a signal in accordance with the displacement of the craft from a reference position about its pitch or athwartship axis. The gyro vertical includes a rotor case 15 that supports a gyroscopic rotor (not shown) therein adapted to spin about a substantially vertical axis. Case 15 is universally mounted relatively to the craft by a gimbal ring 16 whose major axis trunnions are directed parallel to or coincident with the fore and aft axis of the craft as indicated by the term "Fore" and the arrow indicative of the direction of the forward movement of the craft. The ring 16 supports the rotor case 15 through means of a suitable minor axis trunnion connection situated perpendicularly to the major axis thereof, the minor axis being athwartship and corresponding or being parallel to the pitch axis of the craft. As shown, the reference means further includes a suitable electrical synchro or pick-off 17 whose wound stator is fixed to gimbal ring 16 and whose wound rotor is fixed to one of the trunnions extending from the rotor case 15. Energy for the pick-off 17 is obtained from a suitable source of alternating current electrical energy 18 by way of leads to the wound rotor thereof. The illustrated reference means is mounted with freedom relative to the craft so that movement of the craft about its pitch axis, in this instance, from the position established by the reference means results in an electrical signal from pick-off 17 whose amplitude depends on the extent of the angular displacement and whose phase or polarity depends on the direction of the displacement. When the craft is at the attitude about its pitch axis that corresponds to the standard established by the reference means, the output of the signal pick-off 17 is null.

As shown in Fig. 1, the signal of pick-off 17 is fed to the displacement section 20 of the elevator servo amplifier 11 by way of leads 19. The rate section 21 of the amplifier 11 is also supplied with the signal of the pick-off 17 by way of leads 22 connected in parallel across the leads 19 and the leads 24. The outputs of the respective sections 20 and 21 are fed to the power section 25 of the amplifier 11 by way of suitable connecting leads as shown in Fig. 1. In addition to the displacement and rate signals supplied to section 25 from the respective sections 20, 21, a third source of control signal is supplied to section 25 from a repeatback pick-off 26 by way of leads 27. The wound rotor of the synchro or pick-off 26 is shown connected to the elevator 14 by suitable shafting so that the same moves with the elevator as the surface is moved by the servomotor 12 from a trim or streamline position. The rotor of repeatback pick-off 26 is energized by the alternating current energy source 18. The wound stator of the synchro or repeatback pick-off 26 is fixed with respect to the craft and is suitably connected to leads 27. Pick-off 26 provides a signal means for measuring the output of the servomotor 12 of the control system or automatic pilot. The signal of the pick-off 26 is fed back to the power section of the amplifier 11 in opposition to the input to the section 25 from the displacement section 20. The amplitude of the feedback or repeatback signal is dependent on the magnitude of the displacement of the control surface or elevator 14 from trim. The phase of the repeatback signal depends on the direction of sense of such displacement.

The output of the amplifier 11 from power section 25 feeds a motor-generator set of the Ward-Leonard type by way of leads 28 which connect as shown with the field circuit of a direct current generator 29. The armature circuit of the generator 29 energizes the armature of the servomotor 12 by way of leads 30. The field (not shown) of the servomotor 12 is energized from a suitable source of electrical energy. Generator 29 is driven by a constant speed motor 31 that is energized from a constant source of electrical energy. As shown, the armature circuit of the motor 31 may include a battery 32 and a relay 34 whose armature 35 normally engages contact 36 due to the influence of spring 37 to close the armature circuit of the motor 31. The means for monitoring the control system or automatic pilot may be provided in the present application by the armature circuit for motor 31 including relay 34 which operates to open the circuit and render the system ineffective when malfunction occurs as hereinafter more particularly described. The automatic pilot components described to this point are of a conventional nature being found in the hereinbefore noted Patent 2,487,793. For a more detailed disclosure of the section parts generally designated at 20, 21 and 25 in the drawings as the elevator servo amplifier 11, reference is made to the patent to Halpert, Frische, Bird and Esval, No. 2,462,095 issued February 22, 1949, for Electrical Control Systems.

The box 38 in Fig. 1 labeled craft controlling or maneuvering signal means shows three alternatively usable sources of signal information for operating the servomotor 12 that effectively modify the normal reference provided by the control system or automatic pilot. One of these sources is a directional radio receiving means or instrument landing radio receiver 39 that is carried by the craft and is responsive to a suitable ground transmitter (not shown) which produces overlapping differently modulated field pattern lobes or other directionally characteristic radiation defining a particular desired flight path. The indicated receiver 39 provides an output signal in accordance with the magnitude of the displacement of the craft from the predetermined radio defined path. The polarity of the output signal from receiver 39 is dependent on the sense of the displacement of the craft from the radio path. Such radio guidance means is well known and is therefore not shown or described in greater detail.

The second of the controllers for the system is provided by an altimeter having a pick-off connected thereto. The altimeter and pick-off unit may be of the type disclosed in U. S. Patent No. 2,446,546, issued August 10, 1948, to A. W. Meston, in which one end of an atmospheric pressure responsive bellows 40 is fixed relative to the craft and the opposite end contains an actuator rod 41 adapted to position the armature element 42 of a pick-off 44. The stator of the pick-off 44 is fixed to the craft and includes an E-shaped core of magnetic material with a winding on its central leg that is connected to the alternating current source 18. The windings on the outer legs of the fixed core are connected in series opposition so that when the armature 42 is in its central position relative to the core, equal and opposite voltages are induced therein and the net output is zero. Displacement of the armature 42 relative to the core produces a proportional voltage output whose phase depends upon the direction of the displacement of the parts. With the altimeter included in the system, an output from pick-off 44 due to change in altitude of the craft causes operation of the servomotor 12 to effectively modify the reference provided by the signal pick-off 17.

The third controller of the system is shown in the box 38 as a suitable manually settable pick-off 45 of the double wound type such as the pick-off 17 of the reference means 10. In this instance, the stator of the pick-off 45 is fixed in relation to the craft and the rotor is set by a manually adjustable knob 46. The rotor of the pick-off 45 is energized through a suitable conection to the alternating current source 18. With pick-off 45 connected to the automatic pilot or control system, the human pilot is able by changing the setting of knob 46 from a null position to maneuver the craft into a climb or dive attitude.

A two pole, three position, switch 47 is settable by the human pilot so that any one of the described maneuvering controllers may be included in the improved control system or automatic pilot. As shown in the respective figures of the drawing, the switch 47 is set to include the manually settable pick-off 45 in the system.

In the form of the invention shown in Fig. 1, the monitoring function of the invention does not include the reference means or gyro vertical 10. This element of the system with its pick-off 17 provides the first or primary operating signal for the servomotor 12 in accordance with the angular displacement of the craft from a reference position about its pitch axis. In the illustrated pilot system, the rate section 21 of the amplifier 11 provides an output in accordance with the rate of change of the primary reference signal and this signal together with the displacement signal from section 20 are supplied to the power section 25 to effect operation of the servomotor 12. In Fig. 1, the described reference means 10 and pick-off 17 provides the equivalent in the improved control system of the component designated in Fig. 2 as a rate gyro and the component designated in Fig. 3 as the accelerometer device. In this capacity, the reference means 10 and pick-off 17 constitute a sensing means providing a signal in accordance with the actual motion of the craft about the pitch axis. As shown in Fig. 1, the alternating current signal from pick-off 17, sensing the actual movement of the craft is fed to a suitable phase sensitive demodulator and amplifier 48 by way of leads 22. This converts the signal to a direct current signal whose amplitude is adjusted to afford proper comparison with a signal from a signal means providing a measure of the output of the servomotor 12 of the system. The servomotor output signal is obtained in Fig. 1 from the repeatback pick-off 26 by way of leads 49 connected to leads 27. This signal is fed to a second phase sensitive demodulator and amplifier as indicated at 50 where the same is converted to a direct current signal of proper amplitude for comparison purposes. In turbulent flight conditions, the noted signals will not, in general, be properly matched at all times so that consequently each of the signals must be suitably modified before they can be compared. As shown, the signal from amplifier 48 is modified by a coupling network designated at 51. The coupling network for the signal from amplifier 50 is indicated at 52. The outputs of the respective networks 51, 52 are matched in a malfunction detector 54 including means for comparing the noted signals in opposing relation. The arrangement and values of the resistance, capacitance and inductance electrical components included in the respective coupling networks 51, 52 are selected so as to obtain proper matching of the signals when no malfunction is involved from the pick-offs 17 and 26 over a frequency range chosen to cover the major disturbing moments for the craft. Leads 55 connect amplifier 48 to the network 51. Leads 56 connect amplifier 50 to the network 52. The output from network 51 is fed the malfunction detector by way of leads 57. Leads 58 connect the detector 54 and the network 52.

The malfunction detector 54 provides an output for monitoring the system or pilt and includes means for comparing the signals of the output measuring means of the servomotor as obtained, in this instance, from pick-off 26 and the motion sensing means of the system as obtained from pick-off 17, in Fig. 1, in opposed relation. As shown, the detector network 54 includes the resistors 59, 60 and 61. The input signals from networks 51 and 52 are compared in opposition across the resistor 61 of the detector 54 so that in the absence of a malfunction in the system the compared signals match and there is zero voltage across points 62 and 64 of the network. With the occurrence of malfunction in the system or pilot, a signal appears between the network points 62 and 64 across resistor 61. As shown, the monitoring output of the malfunction detector 54 of the system controls the operation of the relay 34 to render the control system or automatic pilot ineffective. In this connection, the winding 65 of relay 34 is connected in parallel with the output leads from the detector 54. Such output leads are connected to the points 62, 64 of the detector network 54.

With a null input from the controlling or maneuvering signal means 38, the system functions as a monitored automatic pilot that is ready upon the occurrence of malfunctions to modify the operations of the system automatically in the interest of the safety of the craft and cargo, and the comfort of its passengers. The improved system is also effective to monitor the systems operations when the craft is maneuvering in accordance with a signal input from receiver 39, from the altimeter pick-off 44, or from the manually settable pick-off 45. In this connection, the signal from the controlling means is shown in the drawing as being fed to the system through leads 66 from switch 47 to the displacement section 20 of the amplifier 11 by way of leads 67. Such signals operate the servomotor 12 and effectively modify the normal reference provided by the control system. In accordance with the present invention, means are provided for compensating the system for the inclusion of the signals of any of the noted craft controlling signal means by a compensating receiver indicated at 68. As shown, the controlling signal means is connected to receiver 68 by way of leads 69, connected to leads 66 from switch 47, a further suitable phase sensitive demodulator and amplifier 70 and leads 71. The arrangement and values of the resistance, capacitance and inductance electrical components forming the illustrated compensating receiver 68 are selected so that the receiver provides an output in accordance with the component of the output of the servomotor 12 due to the inclusion in the system of the signal of the craft controlling means. This signal is utilized in the system to modify one of the signal inputs from networks 51, 52 to the detector 54 so that the detector remains effective whenever malfunction occurs. In the connection shown in the drawing the output of receiver 68 is added to the output of network 51 through means of the connecting leads 72 to leads 57. This arrangement maintains the matching of the signals at detector 54 when a signal from one of the craft controlling means is included in the system and there is no occurrence of malfunction. In operation of the improved system of Fig. 1 with inclusion for example of a maneuvering signal from pick-off 45 therein, as established by the human pilot, the elevator 14 is first moved by the servomotor 12 in accordance with the control signal at displacement section 20. This causes the craft to move about its pitch axis and assume a climb or dive attitude as determined by the setting of the pick-off 45. With operation of the servomotor, the network 52 responsive to pick-off 26 and amplifier 50 provides an input to the malfunction detector 54. This initial input to the detector 54 is matched by an equal and opposite input from the compensating receiver 68 as energized by the controlling signal by way of amplifier 70. As the craft moves about its axis, the signal from the reference pick-off 17 increases until it matches the controlling signal from pick-off 45 so that the net signal for operating the servomotor 12 becomes zero. Until this balanced condition is reached, the outputs of the network 51 and receiver 68 should match the output of the network 52 so that the system is continuously monitored. The input signals for the detector 54 approach null as the system reaches a balanced condition with the craft in a climb or dive attitude as determined by the maneuvering signal means. Should malfunction occur in the system during the maneuver, the detector 54 sensing the malfunction is effective to operate the relay 34 and render the system ineffective or otherwise modified.

In the control system, shown in Fig. 2, the reference means 10 and pick-off 17 are included in the portion of the system that is monitored. In this form of the invention an additional element is included in the system to provide the means for sensing the actual motion of the craft about the axis. As shown in Fig. 2, the sensing means is a rate gyro indicated at 74 and a pick-off 75 whose rotor is fixed to the gimbal mounting 76 of the gyro. The rotor of the pick-off 75 is energized by a suitable connection to the source of alternating current energy 18. The stator of the pick-off 75 is fixed in relation to the craft. The rate gyro is a conventional instrument of this type in which the axis of the gimbal mounting is coincident to or parallel with the longitudinal axis of the craft as indicated by the arrow marked "Fore" in Fig. 2. The gyroscopic rotor of the rate gyro 74 is shown as normally spinning about a substantially vertical axis supported by the mounting 76. With this type of sensing means, a signal is produced by the pick-off 75 in accordance with the rate of rotation of the craft about its pitch axis. The phase of the output signal from pick-off 75 depends on the direction of motion of the craft about its axis. In this form of the invention, the input to the detector 54 from amplifier 48 and network 51 is replaced by a phase sensitive demodulator and amplifier 77 and a coupling network 78. Amplifier 77 is connected to pick-off 75 by way of lead 79. The properly adjusted output of the amplifier 77 is fed the coupling network 78 by way of lead 80. The electrical components of network 78 differ from those shown in network 51 due to the difference in the origin of the input signals thereto. The arrangement and values of the illustrated components of the network 78 are such as to obtain proper matching of the signals compared by the detector in the absence of any malfunction in the system.

A different arrangement is also provided in Fig. 2 for obtaining a measure of the output of the servomotor 12 of the system. In the illustrated arrangement, the amplifier 50 of Fig. 1 has been eliminated by obtaining the signal directly from the leads 30 between the generator 29 and servomotor 12 of the ssytem by way of lead 81. This change also requires a change in the components of the network 82 in Fig. 2 that corresponds to the network 52 in Fig. 1 in order to obtain proper matching of the signal at the detector 54. The arrangement and values of the electrical components of the compensating receiver 83 in Fig. 2 for the signal of the craft controlling means 38 differ from those shown in receiver 68 of Fig. 1 due to the described modifications made in the presently described form of the invention. However, the components of receiver 83 are such as to maintain proper matching at the detector 54 unless malfunction occurs.

The third of the illustrated forms of the invention as shown in Fig. 3 employs a means for sensing the actual motion of the craft about the axis in the form of an accelerometer device indicated at 84. Such device may be the pair of accelerometers shown in Figs. 2 and 3 of the Esval and Halpert Patent No. 2,487,793, that are arranged in the craft as particularly disclosed in Fig. 1 of the patent to provide a signal output in accordance with acceleration of the craft about its pitch axis. The signal is obtained from a resistance bridge arrangement of strain gauges of the character shown and described in U. S. Patent No. 2,334,843 of November 23, 1943, to A. C. Ruge. One of the bridge networks indicated at 85 is energized by battery 86. The other bridge network 87 is energized by battery 88. The two bridge networks 85, 87 are interconnected and the output thereof appears across the leads 89 as a direct current signal. This signal is adjusted in magnitude by means of a suitable amplifier 90 and is fed a coupling network 91 having component arrangements similar to that provided in network 78. The ouput of network 91 is fed the malfunction detector in the manner previously described. Due to the change in the sensing means of the system, the coupling network 92 handling the output signal of the generator 29 is different than the network 82 employed in the system shown in Fig. 2. Also, because of the device 84, it is necessary to modify the arrangement and values of the electrical components of the compensating receiver 93 shown in Fig. 3 of the system for the signal of the craft controlling means 38 in order to obtain proper matching at the detector 54.

The systems shown and described in Figs. 2 and 3, operate in the same manner as that heretofore described in connection with Fig. 1 except that the monitoring output of pick-off 17 is replaced by the output of pick-off 75 in Fig. 2, and is replaced by the output of the accelerometer device 84 in Fig. 3. The systems including the rate gyro 74 or accelerometer device 84 operate so that malfunctions of the reference means 10 and its pick-off 17 are also monitored which is not the case in the form of the invention shown in Fig. 1.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The combination in a control system for dirigible craft of the character normally functioning to maintain the craft at a predetermined reference attitude about an axis, a reversible servomotor operable to move the craft about the axis, craft controlling means providing an operating signal for the servomotor to modify effectively the normal reference provided by the control system, sensing means providing a signal in accordance with the actual motion of the craft about the axis, signal means for measuring the output of the servomotor, a receiver for the signal of said craft controlling means providing an output in accordance with the component of the output of the servomotor due to the inclusion in the system of the signal of said craft controlling means, means for detecting malfunctions providing an output for monitoring the system including means for comparing the signals of said output measurin gmeans and motion sensing means in opposed relation, and means for modifying one of the signals of the comparing means in accordance with the output of said receiver so that the detecting means remains effective whenever malfunction occurs.

2. The combination claimed in claim 1, in which said sensing means is a gyro vertical having a pick-off providing a signal in accordance with the displacement of the craft from a referene position about the axis.

3. The combination claimed in claim 1, in which said sensing means is a rate gyro and pick-off providing a signal in accordance with the rate of rotation of the craft about the axis.

4. The combination claimed in claim 1, in which said sensing means is an accelerometer device providing a signal in accordance with the acceleration of the craft about the axis.

5. An automatic pilot for dirigible craft movable about an axis including a reversible servomotor operable to move the craft about the axis, means providing a first operating signal for the servomotor in accordance with angular displacement of the craft from a reference position about the axis, craft controlling means providing a second operating signal for the servomotor to modify effectively the reference provided by said first signal means, means providing a signal in accordance with the output of the servomotor, a receiver for the signal of said craft controlling means providing an output in accordance with the component of the output of the servomotor due to the inclusion in the pilot of the signal of said craft controlling means, means for detecting malfunctions of the pilot including means for comparing the signals of said servomotor output signal means and said reference position signal means in opposed relation, and means for modifying one of the signals of the comparing means in accordance with the output of said receiver so that the detecting means remains effective whenever malfunction occurs.

6. The combination claimed in claim 5, in whcih said craft controlling means is a manually settable pick-off.

7. The combination claimed in claim 5, in which said craft controlling means is an altimeter having a pick-off connected thereto.

8. The combination claimed in claim 5, in which said craft controlling means is a directional radio receiving means providing an output in accordance with the displacement of the craft from a predetermined radio defined path.

9. An automatic pilot for dirigible craft movable about an axis including a reversible servomotor operable to move the craft about the axis, means providing a first operating signal for the servomotor in accordance with angular displacement of the craft from a reference position about the axis, craft controlling means providing an operating signal for the servomotor to modify effectively the reference provided by said first signal means, means providing a signal in accordance with the output of said servomotor, means providing a signal in accordance with the rate of rotation of the craft about the axis, a receiver for the signal of said craft controlling means providing an output in accordance with the component of the output of the servomotor due to the inclusion in the pilot of the signal of said craft controlling means, means for detecting malfunctions providing an output for monitoring the pilot including means for comparing the signals of said servomotor output signal means, and said craft rate signal means in opposed relation, and means for modifying one of the signals of the comparing means in accordance with the output of said receiver so that the detecting means remains effective whenever malfunction occurs.

10. The combination claimed in claim 9, in which said craft controlling means is a manually settable pick-off.

11. The combination claimed in claim 9, in which said craft controlling means is an altimeter having a pick-off connected thereto.

12. The combination claimed in claim 9, in which said craft controlling means is a directional radio receiving means providing an output in accordance with the displacement of the craft from a predetermined radio defined path.

13. An automatic pilot for dirigible craft movable about an axis including a reversible servomotor operable to move the craft about the axis, means providing a first operating signal for the servomotor in accordance with the angular displacement of the craft from a reference position about the axis, craft controlling means providing an operating signal for the servomotor to modify effectively the reference provided by said first signal means, means providing a signal in accordance with the output of said servomotor, an accelerometer device providing a signal in accordance with the acceleration of the craft about the axis, a receiver for the signal of said craft controlling means providing an output in accordance with the component of the output of the servomotor due to the inclusion in the pilot of the signal of said craft controlling means, means for detecting malfunctions providing an output for monitoring the pilot including means for comparing the signals of said servomotor output signal means and said accelerometer device, and means for modifying one of the signals of the comparing means in accordance with the output of said receiver so that the detecting means remains effective whenever malfunction occurs.

14. The combination claimed in claim 13, in which said craft controlling means is a manually settable pick-off.

15. The combination claimed in claim 13, in which said craft controlling means is an altimeter having a pick-off connected thereto.

16. The combination claimed in claim 13, in which said craft controlling means is a directional radio receiving means providing an output in accordance with the displacement of the craft from a predetermined radio defined path.

17. In an automatic pilot for controlling a dirigible craft movable about an axis, a reversible servomotor operable to move the craft about the axis, means for operating said servomotor including craft maneuvering signal means, signal means providing a measure of the motion of the craft about the axis, signal means providing a measure of the output of the servomotor, a receiver for the signal of said craft maneuvering signal means providing an output in accordance with the component of the output of the servomotor due to the inclusion in the pilot of the signal of said craft maneuvering means, means for detecting malfunctions of the pilot responsive to the output of said receiver, the signal of said servomotor output measuring means and the signal of said motion measuring means, and means operated by said detecting means for monitoring the automatic pilot.

18. In an automatic pilot for controlling a dirigible craft movable about an axis, a reversible servomotor operable to move the craft about the axis, signal means for operating said servomotor including a gyro vertical and pick-off operatively connected to said servomotor, craft maneuvering signal means operatively connected to said servometer, signal means providing a measure of the output of the servomotor, means for detecting malfunctions of the pilot including means for comparing the signals of said servomotor output signal means and said gyro vertical pick-off in opposed relation, and means operated by said comparing means for monitoring the automatic pilot.

19. In an automatic pilot for controlling a dirigible craft movable about an axis, a reversible servomotor operable to move the craft about the axis, means for operating said servomotor including craft maneuvering signal means, a rate gyro and pick-off providing a signal in accordance with the actual motion of the craft about the axis, signal means providing a measure of the output of the servomotor, means for detecting malfunctions of the pilot including means for comparing the signals of said servomotor output signal means and said rate gyro pick-off in opposed relation, and means operated by said comparing means for monitoring the automatic pilot.

20. In an automatic pilot for controlling a dirigible craft movable about an axis, a reversible servomotor operable to move the craft about the axis, craft controlling means providing an operating signal for the servomotor to modify effectively the normal reference provided by the automatic pilot, sensing means providing a signal in accordance with the actual motion of the craft about the axis, signal means for measuring the output of the servomotor, and means for detecting malfunctions providing an output for monitoring the pilot including means for comparing the signals of said servomotor output measuring means and said craft motion sensing signal means, and means for modifying one of the signals of said comparing means in accordance with the signal of said craft controlling signal means.

References Cited in the file of this patent

UNITED STATES PATENTS

| | | |
|---|---|---|
| 2,487,793 | Esval | Nov. 15, 1949 |
| 2,659,041 | Kutzler | Nov. 10, 1953 |
| 2,662,207 | Hollister | Dec. 8, 1953 |
| 2,665,086 | Moog et al. | Jan. 5, 1954 |
| 2,674,711 | MacCallum | Apr. 6, 1954 |